(12) United States Patent
Starcevic et al.

(10) Patent No.: US 10,994,230 B2
(45) Date of Patent: May 4, 2021

(54) ARRANGEMENT AND METHOD FOR SEPARATING OUT AND REMOVING SCREENINGS FROM WASTEWATER

(71) Applicant: HUBER SE, Berching (DE)

(72) Inventors: Nikica Starcevic, Berching (DE); Juergen Kerschensteiner, Pilsach/Laaber (DE); Anton Neger, Beilngries (DE)

(73) Assignee: HUBER SE, Berching (DE)

( * ) Notice: Subject to any disclaimer, the term of this patent is extended or adjusted under 35 U.S.C. 154(b) by 136 days.

(21) Appl. No.: 16/169,619

(22) Filed: Oct. 24, 2018

(65) Prior Publication Data
US 2019/0118121 A1    Apr. 25, 2019

(30) Foreign Application Priority Data
Oct. 25, 2017   (DE) .................... 10 2017 124 991.5

(51) Int. Cl.
*B01D 29/60* (2006.01)
*B01D 29/44* (2006.01)
(Continued)

(52) U.S. Cl.
CPC ......... *B01D 29/60* (2013.01); *B01D 29/0072* (2013.01); *B01D 29/445* (2013.01);
(Continued)

(58) Field of Classification Search
CPC .... B01D 29/01; B01D 29/6484; B01D 29/60; B01D 29/605; B01D 29/94; C02F 1/00;
(Continued)

(56) References Cited

U.S. PATENT DOCUMENTS 2,688,402 A * 9/1954 Butterworth ....... B01D 21/2455
                                                                209/208
4,692,167 A * 9/1987 Levasseur ................. B03B 9/06
                                                                 44/629
(Continued)

FOREIGN PATENT DOCUMENTS

CN       101525209 A     9/2009
CN       202517738 U    11/2012
(Continued)

OTHER PUBLICATIONS

European Search Report, 1817038.2-1002, dated Oct. 31, 2018, 14 Pages.
(Continued)

*Primary Examiner* — Ana M Fortuna
(74) *Attorney, Agent, or Firm* — Dority & Manning, P.A,

(57) ABSTRACT

An apparatus for separating out and removing screenings from wastewater includes a screening device having a screen surface through which the wastewater flows during operation of the screening device and screenings carried along in the wastewater are at least intermittently retained. The apparatus includes a sensor and a controller. The sensor monitors the screenings in the area upstream from the screen surface and/or in the area of the screen surface. The controller outputs a message when the screenings have one or several properties which have been defined and have been recognized by the sensor. In addition, a method for operating the apparatus and a system including the apparatus are provided.

18 Claims, 2 Drawing Sheets

(51) Int. Cl.
*B01D 29/00* (2006.01)
*B01D 29/56* (2006.01)
*B01D 29/64* (2006.01)
*B01D 29/82* (2006.01)
*B01D 29/94* (2006.01)
*B01D 37/04* (2006.01)
*C02F 11/122* (2019.01)
*E02B 8/02* (2006.01)
*E03F 5/14* (2006.01)
*G06T 7/00* (2017.01)

(52) U.S. Cl.
CPC ......... *B01D 29/56* (2013.01); *B01D 29/6484* (2013.01); *B01D 29/82* (2013.01); *B01D 29/94* (2013.01); *B01D 37/04* (2013.01); *C02F 11/122* (2013.01); *E02B 8/026* (2013.01); *E03F 5/14* (2013.01); *G06T 7/0004* (2013.01); *B01D 2201/08* (2013.01); *B01D 2221/00* (2013.01); *G06T 2207/10028* (2013.01)

(58) Field of Classification Search
CPC .......... C02F 2209/001; C02F 2209/005; C02F 2303/24
See application file for complete search history.

(56) References Cited

U.S. PATENT DOCUMENTS

| | | | | |
|---|---|---|---|---|
| 4,792,354 A * | 12/1988 | Matsuo | ................. | C08G 18/10 106/2 |
| 5,571,406 A * | 11/1996 | Mensching | ............ | B01D 29/01 210/159 |
| 6,733,663 B1 * | 5/2004 | Simon | .................... | B01D 29/03 210/104 |
| 7,771,589 B2 * | 8/2010 | Kelly | ..................... | B01D 33/04 210/104 |
| 8,302,780 B1 * | 11/2012 | Mitchell | ................ | B01D 33/76 210/391 |
| 10,086,310 B2 * | 10/2018 | Semling | ............... | A63H 33/101 |
| 10,086,320 B2 * | 10/2018 | Kelly | ................... | B01D 33/333 |
| 10,258,907 B2 | 4/2019 | Rong et al. | | |
| 2009/0314722 A1 | 12/2009 | Kelly et al. | | |
| 2013/0264269 A1 | 10/2013 | Kerl et al. | | |
| 2016/0083265 A1 * | 3/2016 | Wright | ................ | B01D 29/606 210/741 |

FOREIGN PATENT DOCUMENTS

| | | |
|---|---|---|
| CN | 202575323 U | 12/2012 |
| CN | 103213821 A | 7/2013 |
| CN | 204325027 U | 5/2015 |
| CN | 204823082 U | 12/2015 |
| CN | 106457080 A | 2/2017 |
| CN | 106477849 A | 3/2017 |
| CN | 107216012 A | 9/2017 |
| CN | 206496793 U | 9/2017 |
| CN | 206529871 U | 9/2017 |
| CN | 107285603 A | 10/2017 |
| DE | 9314386 | 2/1994 |
| DE | 10229425 | 11/2003 |
| DE | 102007017069 | 10/2008 |
| DE | 102012103058 | 10/2013 |
| DE | 102016102871 | 8/2017 |
| EP | 0554580 | 8/1993 |
| EP | 0685431 | 12/1995 |
| WO | WO 98/15336 | 4/1998 |

OTHER PUBLICATIONS

German Search Report, 10 2017 124 991.5, dated Jun. 1, 2018, 10 Pages.
Chinese Office Action and Translation dated Sep. 9, 2020, 17 pages.

* cited by examiner

ARRANGEMENT AND METHOD FOR SEPARATING OUT AND REMOVING SCREENINGS FROM WASTEWATER

FIELD OF THE INVENTION

The present invention relates to apparatus and method for separating out and removing screenings from wastewater passing through the arrangement and treatment of the screenings removed, wherein the apparatus includes a screening device including a screen surface, through which the wastewater flows during operation of the screening device and with the aid of which screenings carried along in the wastewater are at least partially retained.

BACKGROUND OF THE INVENTION

Corresponding screening devices are sufficiently known from the state of the art and are utilized, for example, for removing coarse screenings (wood, stones, etc.) from wastewater flowing in a sewer. For this purpose, the screening device is generally integrated into the sewer in such a way that the screen surface, proceeding from the channel bed, extends upward vertically or at a slight slant. In order to enable the screenings retained by the bar screen forming the screen surface to be discharged, the screen surface mostly extends above the maximum water level to be expected in the sewer.

Due to a revolving operation of clearing elements, which are assigned to the screen surface and are driven with the aid of a drive, the screenings are finally conveyed upward, along the front side of the screen surface, in the direction of an outlet and, there, are removed from the clearing element or elements, for example, with the aid of a scraper.

A screening device of the generic type is described, for example, in conjunction with FIG. 1 of US 2013 0264269 A1, which entire patent application publication is hereby incorporated herein by this reference for all purposes.

During the operation of the arrangement, it can happen over and over that screenings enter the area of the screening device, which can cause damage to the screening device or a malfunction thereof due to the shape, size, or weight of the screenings, or even the material from which it is made, or other properties thereof. If, for example, an extremely large branch or a life preserver made from plastic is captured by a clearing element or a discharge unit (for example, a conveyor auger) and is conveyed into the area of an outlet, the screenings may become jammed there, and so subsequently delivered screenings can no longer be removed.

The problem is solved by an arrangement, a system, and a method having the features described below.

BRIEF DESCRIPTION OF THE INVENTION

According to the invention, an arrangement for separating out and removing screenings from wastewater passing through the arrangement is initially provided. The arrangement, which is preferably integrated into a municipal sewer or is provided therefor, comprises a screening device including a screen surface which comprises, in particular, multiple screen bars arranged next to each other. In any case, the wastewater flows through the screen surface during operation of the screening device, wherein screenings carried along by the wastewater (e.g., stones, wooden or plastic objects) are retained when the screenings have certain minimum dimensions, wherein the minimum dimensions depend on the mesh size of the screen surface or the spacing of the screen bars.

In order to remove the retained screenings from the screen surface and transport the screenings in the direction of the aforementioned outlet, the screening device can comprise at least one clearing element which is moved at regular intervals or continuously along the screen surface with the aid of a drive of the screening device (for example, an electric motor).

Alternatively, the screen surface can also be designed to be movable, and so screenings are removed from the screen surface due to the movement thereof. For example, the screen surface could be formed by a screen cylinder which is partially immersed into the wastewater, wherein wastewater flows into the screen cylinder via an end face.

According to the invention, in addition to the screening device, at least one sensor is provided. The sensor is designed to monitor the screenings in the area upstream from the screen surface, i.e., for example, within a section of a sewer, which is located ahead of the screening device as viewed in the flow direction of the wastewater. Additionally or alternatively, at least one sensor can be provided, which is designed for monitoring the screenings in the area of the screen surface, i.e., in an area in which the screenings have already come into contact with the screen surface.

The sensor is preferably located at a point which is situated above the maximum wastewater level to be expected. Preferably, the sensor is attached to a wall of a sewer or to the screening device itself.

In addition, a controller is provided and connected to the sensor. The controller is configured so that when the sensor or sensors recognize in the screenings one or several defined properties, then the controller generates a message indicative of the property or properties recognized by the sensor or sensors.

One or several of the following properties can be recognized as a property of the screenings with the aid of the sensor: The position of the screenings in relation to the clearing element which is in contact with the screenings, the size, shape, material, height, width, length, density or reflection behavior of the screenings, or the number of individual screenings arriving at the screening device per unit of time.

It is also pointed out that the particular property does not need to be recognized directly by the sensor. Rather, it can also be provided that the sensor delivers an analog or digital signal to the controller or a processing unit, wherein the actual property is calculated or ascertained by the controller or the processing unit on the basis of the signal.

It is particularly advantageous when the sensor is designed as a camera and a processing unit is also provided and configured for analyzing the signal delivered by the camera, preferably with the aid of image-processing software, and, in this way, ascertaining one or several properties of the screenings. The camera can be a camera which can detect visible light, infrared light, or even UV light.

The camera can also be a so-called time of flight (TOF, or ToF) camera. TOF cameras are 3D camera systems which measure distances using the time-of-flight method. They are also referred to as PMD cameras, due to the PMD sensor which is utilized (PMD sensor=photonic mixing sensor, also referred to as a PMD detector; PMD is the abbreviation for photonic mixing device). For this purpose, the scene is illuminated with the aid of a light pulse, and the camera measures the time required for the light to travel to the screenings and back, for each image point of the screenings. The required time is directly proportional to the distance.

The camera therefore delivers, for each image point, the distance of the section of the screenings imaged thereon and, therefore, in the end, a surface contour of the screenings and, therefore, in turn, a certain property of the screenings.

The arrangement can also comprise several sensors, of course, which may also have different designs.

In addition, the controller does not need to be part of the screening device. Rather, the controller could be located at a point remote from the screening device and could be operatively linked only to the screening device, for example, via a remote connection (for example, via a cloud).

In any case, the arrangement comprises a sensor, with the aid of which one or several properties of the screenings can be recognized or monitored. The controller therefore receives information, with the aid of which conclusions can be drawn regarding whether the screenings which will impact the screen surface soon or which are already in contact with the screen surface pose a danger to the screening device, or not. This information can be forwarded, for example, to an operator of the arrangement.

In particular, the message output by the controller is an optical or acoustic signal (for example, generated by a warning light or a loudspeaker). It is also conceivable that the message is present merely as an analog or digital signal which is evaluated by a further unit (for example, a smartphone or any other type of processing unit). The message can also be output as text, an image, and/or film, which can be depicted on a display which, in turn, is a component of the arrangement or an external device (for example, a smartphone or a tablet).

Additionally, the sensor can be designed for detecting visible light, IR light, or UV light. The sensor can therefore be designed as an infrared or UV sensor. It is also conceivable that the sensor is designed as an ultrasonic sensor or a sound sensor which detects sound in the range audible to humans. It is also conceivable that the sensor is designed as a radar sensor (radar=Radio Detection and Ranging; the radar sensor functions by transmitting an electromagnetic wave and evaluating the echo), as a LIDAR sensor, or as a laser sensor. LIDAR stands for Light Detection and Ranging and describes the method in which a light beam (for example, having a 905 nm wavelength) is transmitted and a distance can be calculated on the basis of the propagation time and the speed of light. A laser sensor, for example, in the form of a laser scanner, is also, strictly speaking, a LIDAR sensor and functions according to the LIDAR principle. The description is utilized often, however, for characterizing a sensor which operates with a diode and rotating mirrors.

It is also advantageous when an embodiment of the present invention includes at least one light source, with the aid of which the screenings upstream from the screen surface (relative to the flow direction of the wastewater passing by the screen surface) and/or in the area of the screen surface (i.e., in the area in which the screenings are in contact with the screen surface) are illuminated when the light source is switched on. The light source can be a source which is designed for transmitting visible light, ultraviolet light (UV light), or infrared light (IR light) during operation. The light source can be a component of the sensor, in particular when the sensor is designed as a camera. It is also conceivable that the sensor and the light source are separate units.

Additionally or alternatively, the sensor can also be designed for detecting sound waves which are generated by a sound source of the arrangement and are reflected by the screenings. The measurement values delivered by the sensor could then be evaluated with the aid of the controller or an appropriate processing unit and one or several properties of the corresponding screenings could be derived therefrom.

The screening device preferably comprises at least one clearing element which can be moved along the screen surface with the aid of a drive of the screening device in order to remove screenings retained by the screen surface from the screen surface and convey the screenings in the direction of an outlet of the screening device. In this case, the screen surface is preferably formed by a plurality of screen bars arranged next to each other. The screen bars can be designed to be straight or even curved.

It is also advantageous when the controller is designed for stopping the aforementioned drive, which effectuates the movement of the clearing element or elements, when the screenings have one or several properties which have been defined and have been recognized with the aid of the at least one sensor. For example, it would be feasible that the drive is stopped or throttled (i.e., slowed down) when screenings which are approaching the screen surface or have already been captured by a clearing element have a spatial dimension which is above a limiting value. A throttling or a stopping of the drive can also be advantageous when the screenings captured by a clearing element are located in an area which lies outside a defined spatial area on the clearing element. The aforementioned drive would be stopped in this case in order to avoid a tilting or jamming of these screenings within the screening device.

In contrast to the state of the art, therefore, it is not (only) the function or a possible malfunction of the screening device which is detected. Rather, the arrangement, with the sensor, comprises an element which is suitable for gathering information regarding the screenings which are approaching the screening device or are already located in the area of the screen surface, which information is suitable for predicting a possible malfunction of the screening device. The arrangement can therefore proactively prevent a corresponding malfunction, in that a message is output or the drive of the clearing element or elements (or of the screen surface, when the screen surface is designed to be movable) is stopped when a piece of screenings material is detected which has one or several defined properties.

Alternatively, it would also be conceivable that the controller merely outputs a message which notifies the operator of the arrangement that a piece of screenings material which has one or several undesirable properties is approaching the screen surface or is already in contact therewith. The message can also contain the information that the movement of the clearing element or elements has stopped or the operation of the screening device has stopped or its delivery rate should be throttled in order to avoid damage to or a malfunction of the screening device.

It is advantageous when the screening device comprises a scraper. The scraper is preferably located in the upper area of the screening device or of the screen surface and is utilized for scraping screenings off the clearing element or elements in the area of the outlet. Preferably, the scraper is spring-loaded and fits snugly against a clearing element as it passes by the clearing element. Due to the relative movement between the clearing element and the scraper, the corresponding screenings are scraped off. The screenings finally leave the screening device via the outlet. Preferably, it is now provided that the scraper is movable, preferably pivotable about a pivot axis, between a scraping position and a passage position with the aid of a drive arrangement of the screening device. While the scraper assumes a position in the scraping position, in which the scraper comes into contact with a clearing element moving past the scraper, the scraper is located in the passage position in such a way that there is a minimum distance of at least 10 cm, preferably of at least 20 cm, between the scraper and the clearing element moving past the scraper.

If screenings which pass by the sensor have one or several certain properties which would or could bring about mechanical damage to the scraper or the clearing elements, or which would or could bring about a malfunction of the scraper, then the scraper is brought into its passage position. In this case, the corresponding screenings can pass by the scraper and, finally, due to the force of gravity, fall from the clearing element conveying the screenings.

In addition, the signals from the sensor or sensors can also be utilized for controlling a device installed downstream from the arrangement or for influencing the operation thereof. The downstream device is preferably a device for treatment of the screenings removed from the wastewater by the described screening device. For example, the downstream device can be a drying device or a press which is designed for reducing the water content of the screenings by way of a pressing operation.

In particular, it is provided that the downstream device includes a machine controller which is operatively linked to the aforementioned arrangement, wherein the machine controller is designed for controlling the downstream device with consideration for the signals delivered by the sensor of the aforementioned arrangement. For example, it would be conceivable that the operation of the aforementioned downstream device is stopped when the screening device is also stopped. The stopping can take place automatically by way of the machine controller. The delivery rate or the drying capacity of the downstream device can also be changed depending on the properties of the screenings, which are recognized with the aid of the sensor or sensors.

The subject matter of the invention, therefore, is also a system for treating wastewater, which comprises an arrangement according to the above description and/or following description, as well as at least one downstream device, which is installed downstream from the screening device, for treating the screenings retained by the arrangement.

Furthermore, the invention comprises a method for operating an arrangement for separating out and removing screenings from wastewater passing through the arrangement. The arrangement is preferably an arrangement having the features mentioned above and/or in the following, wherein the individual features can be implemented in any combination.

In particular, the arrangement comprises a screening device including a screen surface, through which wastewater flows during operation of the screening device, and with the aid of which screenings carried along in the wastewater are at least partially retained. The screening device also preferably includes at least one clearing element which is moved at least intermittently along the screen surface in order to remove screenings, which have been retained by the screen surface, from the screen surface and convey the screenings in the direction of an outlet of the screening device.

Finally, it is provided that the arrangement comprises at least one sensor, wherein the screenings are monitored with the aid of the sensor in the area upstream from the screen surface or in the area of the screen surface, wherein a message is output when the screenings have one or several properties which have been defined and have been recognized with the aid of the sensor. Reference is made to the description presented herein with respect to possible sensors or the type of conceivable messages.

An embodiment of a method in accordance with the present invention includes using at least one sensor for monitoring the screenings, wherein inferences regarding one or several properties of the monitored screenings are drawn on the basis thereof. Among the possible properties which can be monitored are those mentioned in the portion of the description provided above.

With the aid of the sensor, it can therefore be detected whether screenings are approaching the screen surface or have already been captured by a clearing element, which have one or several properties which make it difficult to further transport these screenings to the outlet of the screening device or which can cause mechanical damage or a malfunction of the screening device when transported. Upon such detection, a message is outputted.

Due to the output of the message, the operator of the arrangement or its controller is informed that the screening device is at risk. The operator can finally act in an appropriate way, for example, by stopping the clearing element or elements and manually removing the relevant screenings from the screening device.

It is also advantageous when the sensor is designed as a camera and the signal from the camera is evaluated with the aid of image-processing software and, in this way, one or several properties of the screenings is/are determined. The software can be a component of the controller. It is also conceivable that the signal from the camera is forwarded to a separate processing unit, for example, a portable computer, a tablet, or a smartphone, and is evaluated there. One or several properties such as spatial dimensions, the shape and position or even the type of screenings, can be recognized with the aid of the image-processing software.

It is particularly advantageous when the signal from the camera is forwarded to a display of the arrangement or to an external display, for example, of a smartphone, at least intermittently and in the form of individual images or as film (so-called streaming). In this case, the screening device can also be monitored from a point at which the screening device cannot be directly visually inspected. It is conceivable, for example, to transmit the signal or the properties of the screenings derived therefrom to a control station of the operator of the arrangement, which is located remotely from the screening device.

Moreover, it is generally pointed out that the screening device can comprise a screen surface which is formed by a screen cylinder driven about a rotational axis, wherein the screen cylinder is immersed into the wastewater in such a way that the wastewater flows into the screen cylinder via an end face of the screen cylinder. The removal of the screenings retained by the screen cylinder takes place in this case, for example, with the aid of a conveyor auger.

Moreover, it is advantageous when the controller presents a proposal to an operator of the arrangement regarding whether to stop the operation of the screening device or to throttle the delivery rate thereof, or whether the clearing element or elements are to be stopped or the movement thereof is to be throttled if the screenings have one or several defined properties. When one or several properties of screenings have been recognized, which infer that there are problems during the operation of the screening device, in particular during the transport of these screenings by the clearing element or elements, the message can include the proposal to the operator that the drive of the clearing element or elements is to be stopped or the drive is to be operated more slowly in order to avoid damaging the screening devices. Additionally or alternatively, the message can include the proposal to stop the screening device or to throttle its delivery rate (i.e., the amount of screenings discharged per unit of time).

It is also advantageous when the controller takes into account, during the presentation of the proposal, whether one or several of the proposals previously presented to the operator has/have been taken into account by the operator, or not. When the controller knows, from the past, for example, that the operator has actually not implemented the proposal to stop the clearing element or elements when the property of the screenings was in a certain range, it can be provided that this proposal is no longer presented in the future. The controller can therefore be designed to be self-learning and can adapt the proposals on the basis of the behavior by the operator.

In general, it is therefore advantageous when the controller takes the past behavior by the operator into account when evaluating the signal from the sensor or sensors. Limiting values of the signal from the sensor or sensors, which, when reached or exceeded or fallen below, prompt a message to be output and/or the drive of the clearing element or elements to be stopped or throttled, can therefore be changed over time.

It is particularly advantageous when external data such as climate or weather data (for example, rain forecasts), social events (for example, festivals in an area in which the wastewater is directed to the arrangement according to the invention), or calendar data (for example, the season) are taken into account in the decision whether to output a message, or not. Depending on these data, further operators, for example, can be ordered to the arrangement in order to be capable of more quickly resolving critical conditions of the arrangement, which are to be expected more or less frequently.

It is also advantageous when the controller stops the movement of the clearing element or elements or slows down the movement thereof when the screenings, which are monitored with the aid of the at least one sensor, have one or several defined properties, wherein the movement is stopped before or after the corresponding screenings have come into contact with the screen surface. Additionally or alternatively, the operation of the screening device can also be stopped or its delivery rate can be throttled.

It is also extremely advantageous when the signals delivered by the sensor and/or the property or properties recognized with the aid of the sensor are stored in a database and are evaluated with respect to predefined characteristic values. For example, it would be conceivable that statistics are compiled regarding the presence of certain properties of the screenings or their change over time. As a result, anomalies can be quickly recognized and the arrangement can be rapidly adapted, wherein, for example, the change in the delivery speed of the clearing element or elements can count for this purpose.

BRIEF DESCRIPTION OF THE DRAWINGS

Further advantages of the invention are described in the following exemplary embodiments. Schematically.

DETAILED DESCRIPTION OF EXEMPLARY EMBODIMENTS OF THE INVENTION

It should be noted at the outset that, in figures which show several components or sections (such as clearing elements 4) of the same kind, only one or two of these several components or sections of the same kind are provided with reference signs in some cases, for the sake of clarity.

Figure 1:
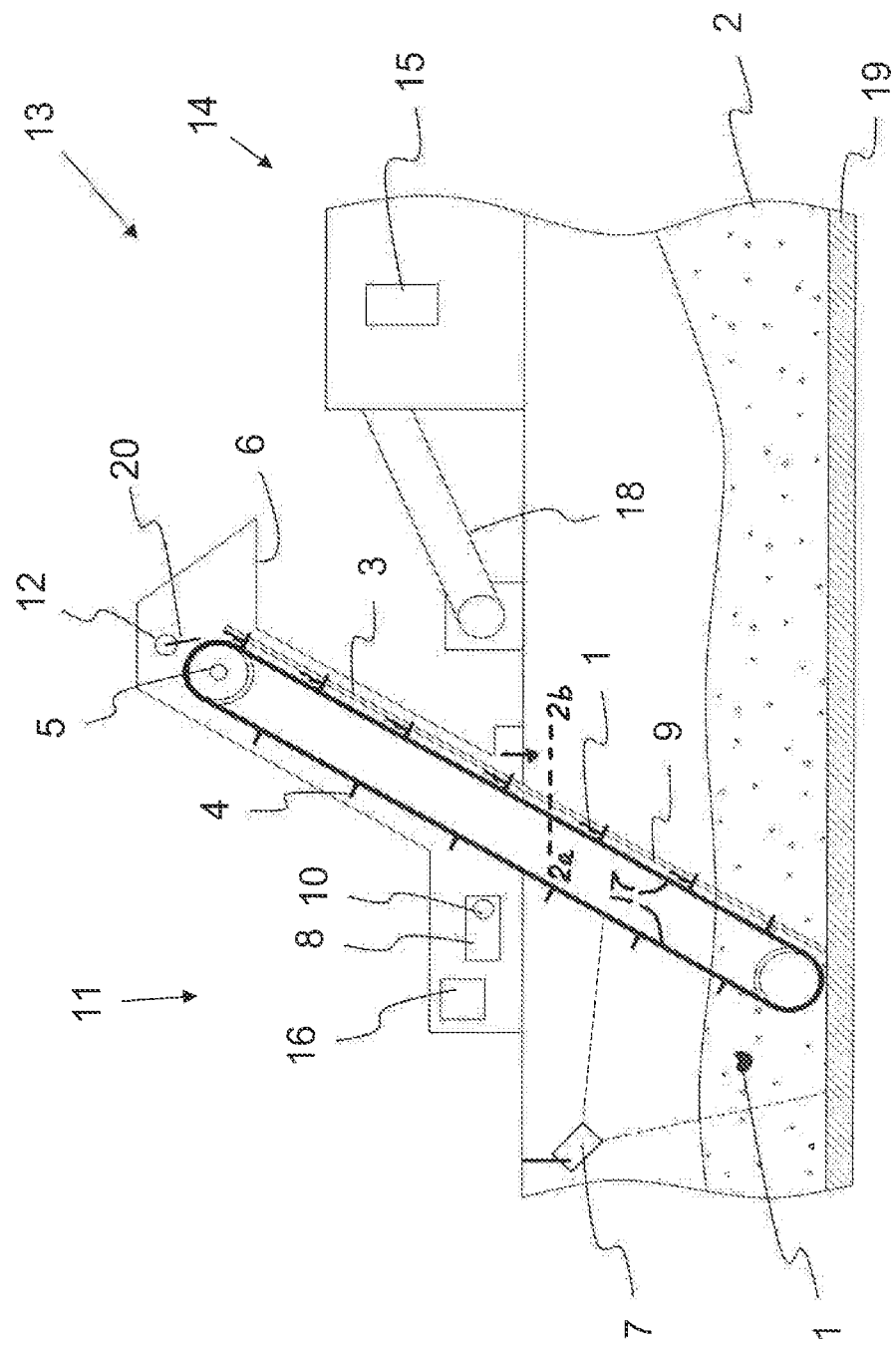
FIG. 1 shows a system according to the invention comprising an arrangement according to the invention for separating out and removing screenings from wastewater.

FIG. 1 shows an arrangement 11 according to the invention for separating out and removing screenings 1 (for example, in the form of stones, branches, etc.). The arrangement 11 desirably is configured to be integrated into a sewer 19 and comprises a screening device that includes a screen surface 3, which extends into the wastewater 2 obliquely from above. The screening surface 3 desirably is provided in the form of a bar screen that is connected to a frame of the screening device and, if necessary, also to the channel bed of the sewer 19 with the aid of fastening elements (not shown). The screen surface 3 preferably comprises several screen bars 9 arranged next to each other. The view of each of FIGS. 2a and 2b points along the arrow at the cut plane that is schematically represented in FIG. 1 by the dashed line designated 2a-2b to show a top view of a detail of a corresponding screening device.

Moreover, the arrangement 11 comprises two traction elements 17 (for example, in the form of drive chains) which, relative to the sheet plane, are arranged one behind the other and are spaced from each other and can be moved in a circulating manner in front of the screen surface 3, with respect to the flow direction of the wastewater 2, with the aid of a drive 5, and which are connected to each other via multiple intermediate clearing elements 4 (only one clearing element 4 may also be sufficient). The traction elements 17 are guided in their path via lateral guides (not shown), wherein the guidance can be located in the upper and the lower deflection areas, but also in the intermediate areas, in which the traction elements 17 extend in parallel to each other.

The clearing elements 4 preferably comprise a plurality of cleaning tines 21 which are arranged next to one another and engage into each of the intermediate spaces that are defined between each pair of adjacent bars 9 forming the screen surface 3 when the clearing element 4 passes by the upstream-facing front side of the screen surface 3 (cf. also FIGS. 2a and 2b) by way of the traction elements 17 being driven in the conveyance direction (in the counterclockwise direction, according to FIG. 1).

The screenings 1 retained by the screen surface 3 (the wastewater flow proceeds from left to right in FIG. 1) are finally captured by the clearing elements 4 or their cleaning tines 21 and are conveyed upward. Before moving past the upper turning point, the screenings 1 finally are offloaded from the clearing elements 4 and enter an area defined by an outlet 6, possibly with the aid of the scraper 20 which is shown but is not absolutely necessary. From the outlet 6, the screenings 1 are conveyed outward, for example, into a container (not shown). The clearing elements 4 are finally guided back to the lower turning point, and so the cycle can start over from the beginning.

Incidentally, the trajectory of the clearing element or elements 4 does not necessarily need to extend completely in front of the screen surface 3 (relative to the flow direction of the wastewater 2). Rather, an embodiment which is not schematically depicted is also contemplated, in which the clearing element or elements 4 "encircle" the screening surface 3 in the side view shown (in this case, the clearing elements 4 are moved in front of the screen surface 3 with screenings 1 and behind the screen surface 3 without screenings 1).

As FIG. 1 also shows, a device 14 for treating the screenings 1 can be installed downstream from the screening device or the arrangement 11 according to the invention, which comprises not only the screening device but also at least one aforementioned sensor 7. This device 14 can be designed, for example, as a press or a drying system (centrifuge, solar dryer, etc.) and is utilized for reducing the water content of the screenings 1 that leave the screening device. For example, the screenings 1 can be transported, with the aid of a conveyor belt 18, to the aforementioned device 14 which, together with the arrangement 11 according to the invention, forms a system 13 for treating wastewater 2.

Preferably, the device 14 comprises a machine controller 15 which is connected to and interacts with the controller 8 of the screening device or to the aforementioned arrangement 11 or a processing unit 10 thereof.

According to the invention, the arrangement 11 comprises one or several sensors 7, which detect and differentiate one or several properties of the screenings 1 approaching the screen surface 3 in the wastewater 2 or the screenings 1 already located in the operating range of a clearing element 4. The possible properties or possible features of the sensor 7 have been mentioned above in the general description.

In general, it is contemplated in accordance with at least one exemplary embodiment that the sensor 7 is located on the screening device or, as shown in FIG. 1, even on a wall of the sewer 19 into which the screening device is integrated. In FIG. 1, the sensor 7 is designed as a camera, wherein the camera's field of view is schematically represented as being defined between the two dashed lines.

The sensor 7, in turn, is operatively linked to a controller 8 of the arrangement 11 or of a processing unit 10 thereof. Moreover, the arrangement 11 can comprise a display 16 on which a message can be displayed when the monitored property/properties of the screenings 1 fulfills/fulfill certain pre-determined criteria. The display 16 can also be a component of a remote device, for example, a smartphone.

It is also contemplated that the scraper 20 is moved into a passage position with the aid of a drive arrangement 12 when the screenings 1 have certain properties, in order to prevent an undesirable collision of these screenings 1 with the scraper 20.

Figure 2A:
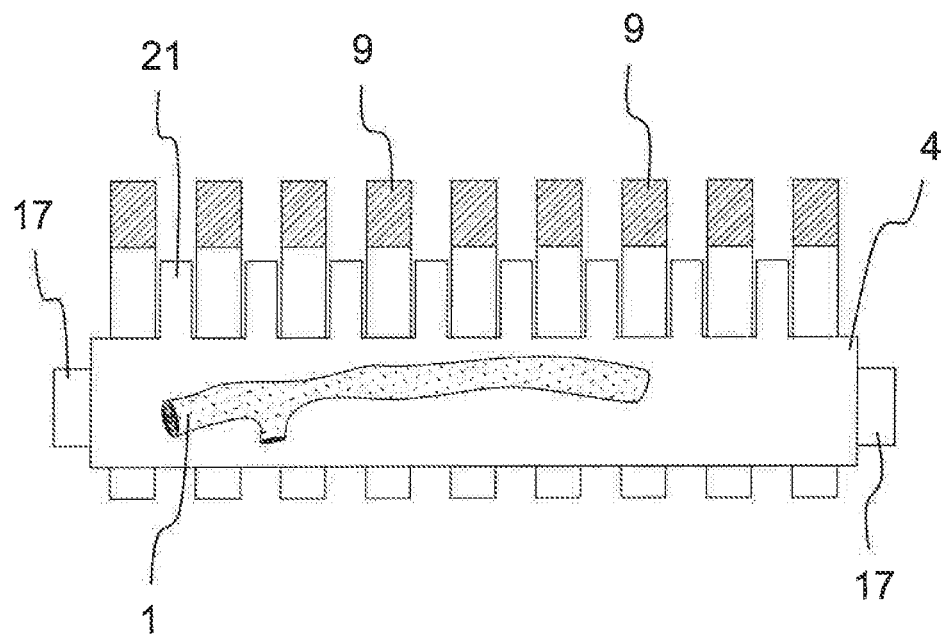
FIG. 2a shows a top view of a detail of a screening device according to the invention.

FIG. 2*a* shows a top view of a detail of an arrangement 11 according to the invention. As is schematically shown in FIG. 2*a*, screenings 1 in the form of a branch have been retained by the screen surface 3, which is formed by a plurality of screen bars 9; and the branch now have been captured by a clearing element 4. If this branch would now be conveyed upward and, ultimately, to the outlet 6, then no problems are to be expected.

Figure 2B:
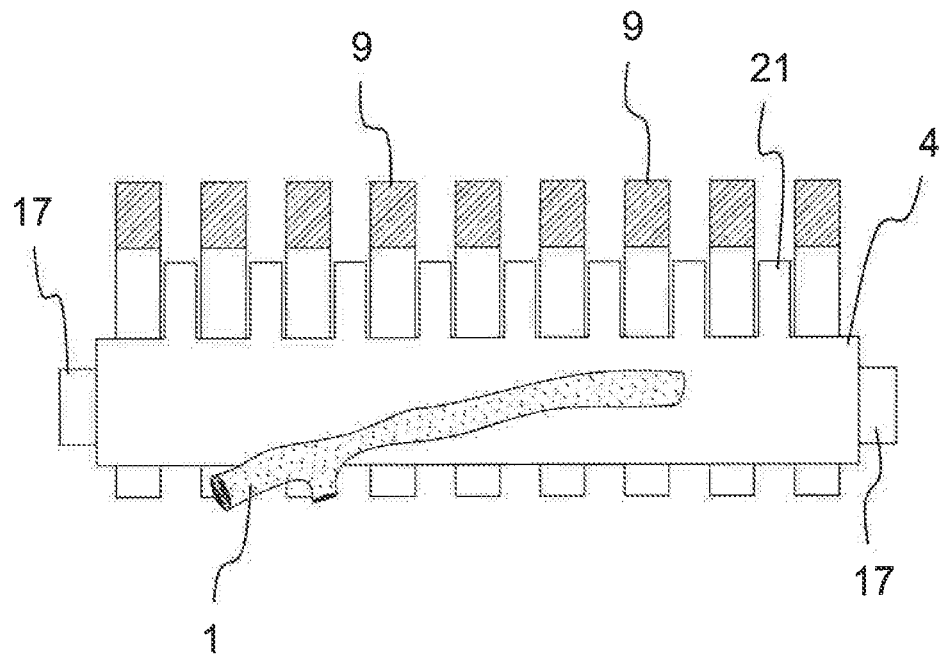
FIG. 2b shows a top view of a detail of a screening device according to the invention including a changed position of a piece of screenings material.

This is not the case with the situation in the case of FIG. 2*b*. In this case, one portion of the branch 1 lies outside the clearing element 4, and so there is a risk that the branch will become jammed between the clearing element 4 and a wall or any other section of the screening device as the clearing element 4 continues to move. The property monitored by the sensor 7 in this case could therefore be the position of the piece of screenings material 1 with respect to the clearing element 4.

If the branch 1 schematically shown in FIG. 2*b* is now detected by the sensor to be in a position that does not correspond to the requirements for a smooth operation of the arrangement 11, then a message is output by the controller 8 and, if necessary, the drive 5 is stopped. Moreover, it is also contemplated that the downstream device 14 is also can be stopped or its delivery rate can be throttled.

In the end, the invention therefore provides that defined properties of the screenings 1 are monitored and, on the basis of these properties, messages are output or the operating behavior of the described arrangement 11 or of the aforementioned device 14 is adapted in order to avoid malfunctions and damage.

The present invention is not limited to the exemplary embodiments which have been represented and described. Modifications within the scope of the claims are also possible, as is any combination of the described features, even if they are represented and described in different parts of the description or the claims or in different exemplary embodiments, provided no contradiction to the teaching of the independent claims results.

LIST OF REFERENCE SIGNS

1 screenings
2 wastewater
3 screen surface
4 clearing element
5 drive
6 outlet
7 sensor
8 controller
9 screen bar
10 processing unit
11 arrangement for separating out and removing screenings
12 drive arrangement
13 system for removing contaminants from wastewater
14 device for treating screenings
15 machine controller
16 display
17 traction element
18 conveyor belt
19 sewer
20 scraper
21 cleaning tines

What is claimed is:

1. An arrangement for separating out and removing screenings from wastewater, comprising:
 a screening device including a screen surface permeable to wastewater but impermeable to screenings carried along in the wastewater to at least the extent of intermittently retaining the screenings and thereby separating out and removing screenings from wastewater;
 a sensor aimed at the screen surface for monitoring the screenings at the screen surface; and
 a controller connected to the sensor and which is designed for outputting a message when the screenings monitored by the sensor have at least one predetermined property that is detected by the sensor, wherein the at least one predetermined property is selected from the following group of predetermined properties: the type of the screenings, the size of the screenings, the shape of the screenings, the material composition of the screenings, the density of the screenings, the reflectiveness of the screenings and the number of individual screenings arriving at the screening device per unit of time.

2. The arrangement as in claim 1, further comprising:
a processing unit connected to the sensor and including image-processing software;
wherein the sensor includes a camera, and wherein the image-processing software is designed for analyzing a signal delivered by the camera for ascertaining the at least one predetermined property of the screenings.

3. The arrangement as claimed in claim 2, wherein the camera is a time of flight (TOF) camera.

4. The arrangement as claimed in claim 1, wherein the sensor is a radar sensor, an infrared sensor, a LIDAR sensor, an ultrasonic sensor, or a laser sensor.

5. The arrangement as in claim 1, further comprising a light source, with the aid of which the screenings upstream from the screen surface and/or in the area of the screen surface are illuminated when the light source is switched on.

6. The arrangement as in claim 1, wherein the screening device comprises a drive, an outlet and at least one clearing element which can be moved along the screen surface with the aid of the drive of the screening device in order to remove screenings retained by the screen surface from the screen surface and convey the screenings in the direction of the outlet of the screening device.

7. The arrangement as in claim 6, wherein the controller is designed for stopping or throttling the drive when the screenings have at least one of the predetermined properties that are detectable with the aid of the sensor.

8. The arrangement as in claim 6, wherein the screening device comprises a scraper that is configured and disposed near the outlet for scraping the screenings off the clearing element when the clearing element is moved, and wherein the scraper is movable with the aid of the drive of the screening device between a scraping position and a passage position.

9. A system for treating wastewater, comprising an arrangement as claimed in claim 1 and further comprising a device, which is installed downstream from the arrangement, for treating the screenings retained by the arrangement, wherein the device comprises a machine controller which is operatively linked to the arrangement, wherein the machine controller is designed for controlling the device with consideration for a signal delivered by the sensor of the arrangement.

10. A method for operating an arrangement for separating out and removing screenings from wastewater passing through the arrangement, wherein the arrangement includes a screening device including a screen surface, through which the wastewater flows during operation of the screening device and with the aid of which screenings carried along in the wastewater are at least intermittently retained, and the arrangement includes at least one sensor, the method comprising the following steps:
using the sensor aimed at the screen surface to monitor the screenings in the screen surface;
using the sensor to detect at least one predetermined property of the screenings monitored in the screen surface; and
when the sensor detects the at least one predetermined property of the screenings, wherein the at least one predetermined property is selected from the following group of predetermined properties: the type of the screenings, the size of the screenings, the shape of the screenings, the material composition of the screenings, the density of the screenings, the reflectiveness of the screenings and the number of individual screenings arriving at the screening device per unit of time, and then outputting a signal indicative of the detected predetermined property.

11. The method as in claim 10, wherein the sensor includes a camera, and the method further comprising the step of using image-processing software in evaluating the signal from the camera to determine the property of the screenings that was detected.

12. The method as in claim 10, wherein the signal from the sensor is forwarded to a display of the arrangement or to an external display, at least intermittently and in the form of individual images or as film.

13. The method as in claim 10, wherein the screening device includes a clearing element, the method further comprising the steps of:
moving the clearing element along the screen surface, at least intermittently, in order to remove screenings retained by the screen surface from the screen surface; and
conveying the screenings in the direction of an outlet of the screening device.

14. The method as in claim 13, wherein the arrangement includes a controller, the method further comprising the step of:
using the controller to stop or slow down the movement of the clearing element and/or to stop the operation of the screening device or to throttle the delivery rate thereof when the screenings monitored with the aid of the sensor have one or several defined properties.

15. The method as in claim 10, wherein the arrangement includes a controller, the method further comprising the step of:
using the controller to present a proposal to an operator of the arrangement regarding whether to stop the operation of the screening device or to throttle the delivery rate thereof, and/or whether the movement of the clearing element or elements is to be stopped or slowed down if the screenings have one or several defined properties.

16. The method as in claim 15, wherein the controller takes into account, during the presentation of the proposal, whether a proposal Original to the operator has been taken into account by the operator.

17. The method as in claim 10, wherein external data selected from the group consisting of climate or weather data, social events, or calendar data, affects whether a signal indicative of the detected predetermined property is outputted.

18. The method as in claim 10, the method further comprising the steps of:
storing in a database the signals delivered by the sensor and/or the properties detected with the aid of the sensor; and
evaluating the signals and/or the properties stored in the database with respect to predefined characteristic values.

* * * * *